Oct. 15, 1940.  R. T. MICKLE  2,218,453
AIR FILTERING MEANS
Filed Jan. 3, 1938  5 Sheets-Sheet 1

INVENTOR
Robert T. Mickle,
BY
ATTORNEY

Oct. 15, 1940.   R. T. MICKLE   2,218,453
AIR FILTERING MEANS
Filed Jan. 3, 1938   5 Sheets-Sheet 2
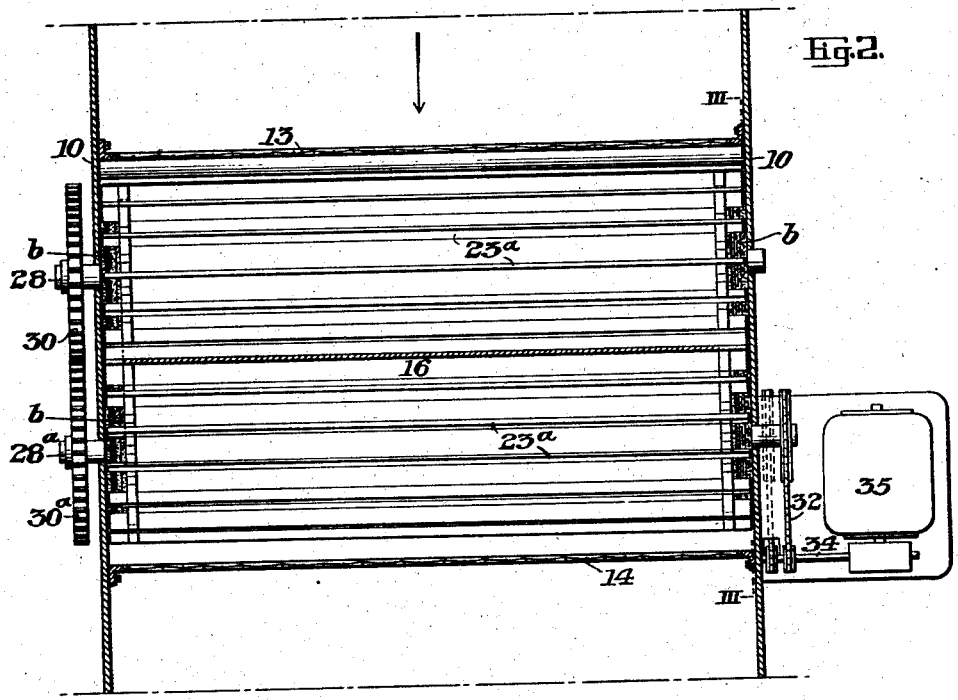
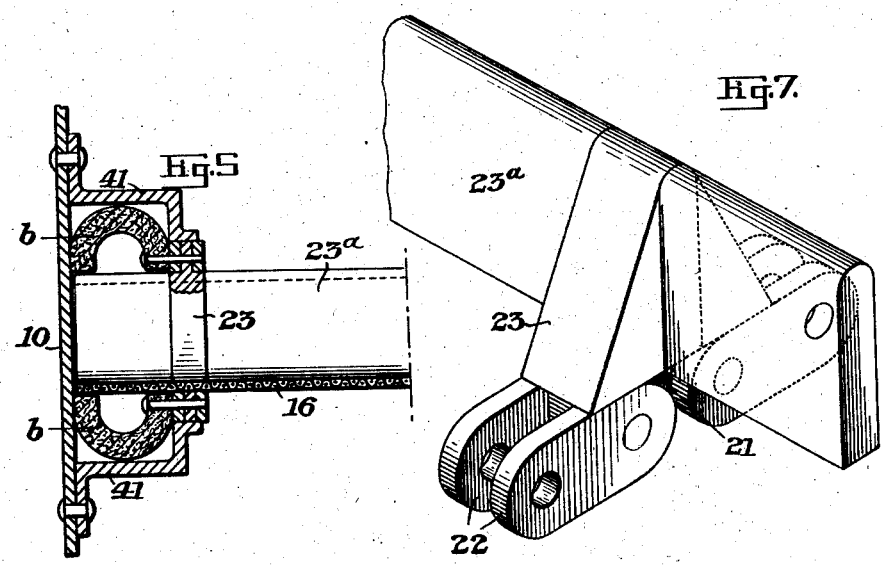
INVENTOR
Robert T. Mickle
BY
ATTORNEY

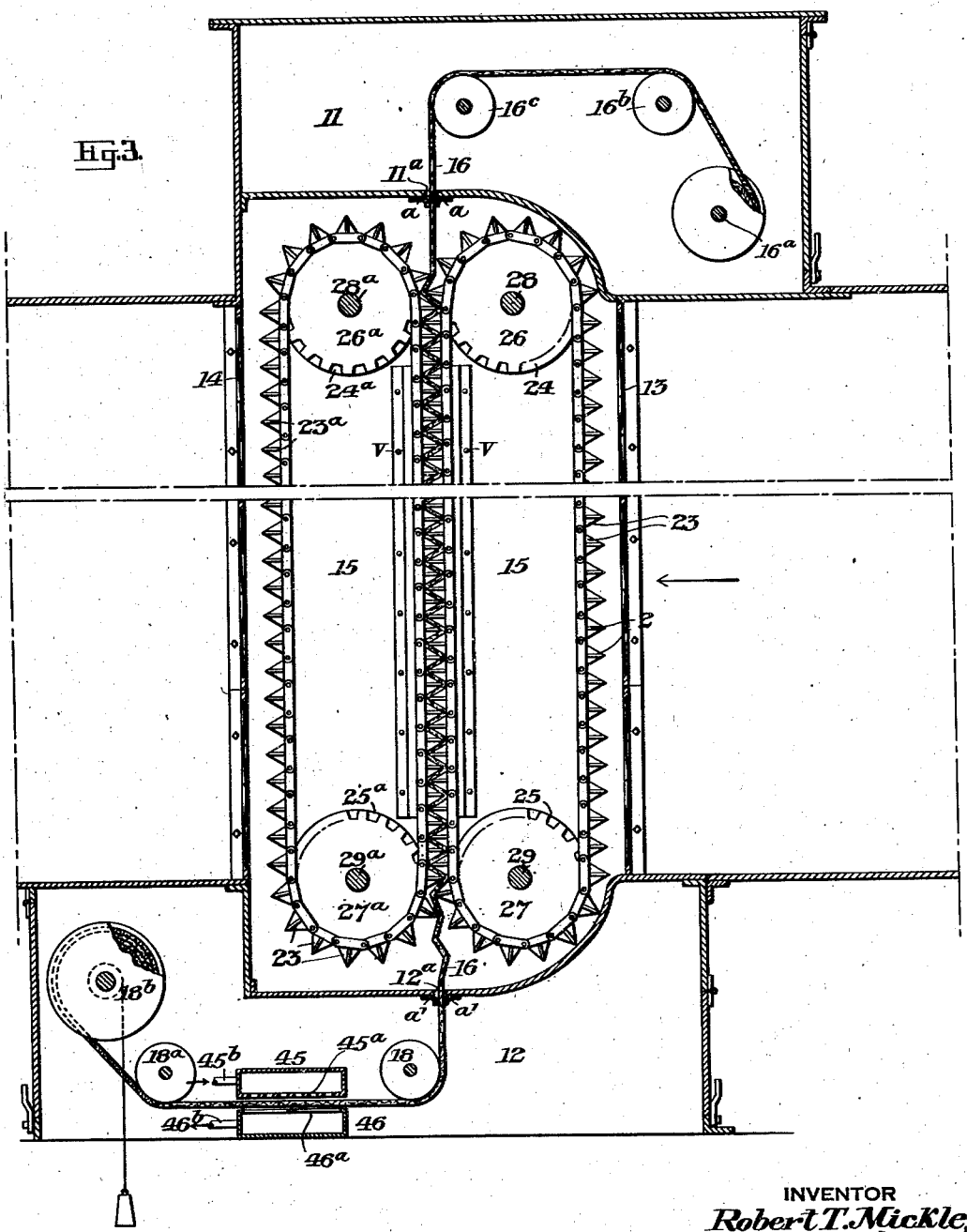

Oct. 15, 1940. R. T. MICKLE 2,218,453
AIR FILTERING MEANS
Filed Jan. 3, 1938 5 Sheets-Sheet 4

INVENTOR
Robert T. Mickle,
BY
ATTORNEY

Oct. 15, 1940.  R. T. MICKLE  2,218,453
AIR FILTERING MEANS
Filed Jan. 3, 1938   5 Sheets—Sheet 5
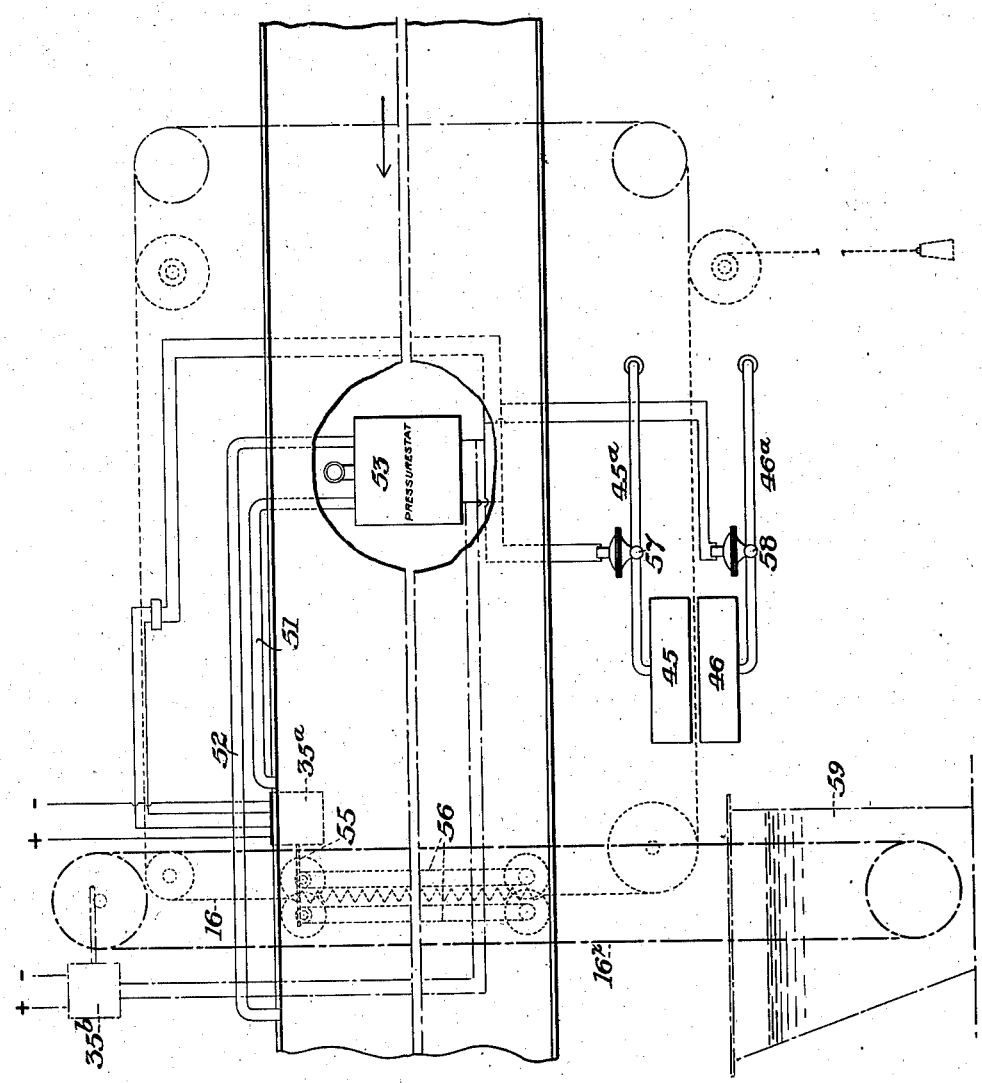
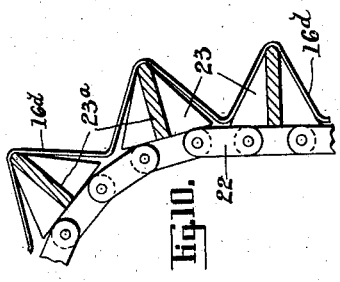
INVENTOR
Robert T. Mickle,
BY
ATTORNEY Patented Oct. 15, 1940

2,218,453

UNITED STATES PATENT OFFICE 2,218,453

AIR FILTERING MEANS

Robert T. Mickle, Philadelphia, Pa.

Application January 3, 1938, Serial No. 183,031

10 Claims. (Cl. 183—62)

My invention relates to air- and/or gas-filtering, and one object of my invention is to provide means for continuously moving a sheet or web of filtering media across an air duct or other passage and of sealing the edges of the same against the passage of unfiltered air and/or other gaseous body into the delivery side of such duct or passage.

A further object of my invention is to provide means for crimping or corrugating the sheet or web of filtering media simultaneously with its movement whereby I can materially increase the filtering area for any given size of duct; such filtering medium being maintained in the crimped or corrugated condition while passing across the duct by the means which effect its movement.

A further object of my invention is to provide moving means for said sheet or web which may comprise pairs of conveyors made up of pivotally connected links equipped with projecting elements forming distending means, and to arrange vertical runs of pairs of such conveyors in such cooperative relation that the distending means carried thereby will crimp or corrugate the sheet or web of filtering media passing between the same and maintain it in the crimped or corrugated condition during movement. For this purpose certain of the links of the conveyers are provided with pointed teeth with cross-bars or blades connecting the same; such cross-bars or blades lying outwardly with respect to the links and, when the conveyers are moved relatively to each other, serving to crimp or corrugate the sheet or web of filtering media moved by the same. In addition, the cross-bars or blades may cause the sheet or web of filtering media at its bends to contact with the surfaces of drums associated with the conveyers so as to prevent the passage of unfiltered air.

A further object of my invention is to utilize a type of filter paper as the filtering medium and to pass the same into proper engagement with the corrugating means carried by the chains or belts, whereby such paper will be crimped or corrugated and so held during movement across the air duct or passage.

A further object of my invention is to employ filtering media in the form of loosely felted material, properly confined in web or sheet form, and to pass the same continuously across the full area of the air duct or passage; such material being crimped or corrugated as it is moved.

A further object of my invention is to employ as the filtering media a mass of flocculent, fibrous material which may be incapable normally of supporting its own weight and to pass the same between suitable foraminous material serving as supporting and conveying means; such foraminous material, with the flocculent mass, being simultaneously corrugated and moved, and being subject to cleansing after it has performed its work. In the use of material of this type the compound web will be moved by and between corrugating elements extending across the full area of the air duct or passage.

A further object of my invention is to provide filtering media of mineral fibres—spun glass, for instance—for the purpose of removing suspended matter from gases.

A further object of my invention is to provide means for automatically and continuously cleansing such filtering media as it is employed.

And a still further object of my invention is to provide means for effecting movement of the filtering web or sheet under control of the differential pressure existing in the duct or passage on opposite sides of the same, which increases on one side as the filtering web or sheet collects dust, particles of dirt, etc., from the air and/or gas passing through the same; such differential reacting upon a suitable pressure that which in turn closes a switch to start a motor and effect such movement of the filtering web or sheet as to bring a completely fresh section across the duct or passage. This may be employed with various types of filtering media in sheet or web form, whether corrugated or not.

These and other features of my invention are more fully set forth hereinafter; reference being had to the accompanying drawings, more or less diagrammatic in character, in which:

Fig. 2 is a sectional plan view taken on the line II—II, Fig. 1, showing the conveying and corrugating mechanism.

Fig. 3 is a cross sectional elevation taken on the line III—III, Fig. 2.

Fig. 5 is a fragmentary sectional view on an enlarged scale taken on the line V—V, Fig. 3, and illustrating a detail of my invention.

Fig. 7 is a fragmentary perspective view illustrating a detail of the conveyer chain and one of the cross bars or blades carried by the same.

Fig. 9 is a diagrammatic view illustrating means for shifting a section of the filtering web or sheet whose operation is controlled by mechanism affected by the difference in pressure in the air duct or passage on opposite sides of said filtering web or sheet, and Fig. 10 is a fragmentary view illustrating a detail of my invention.

Figure 1:
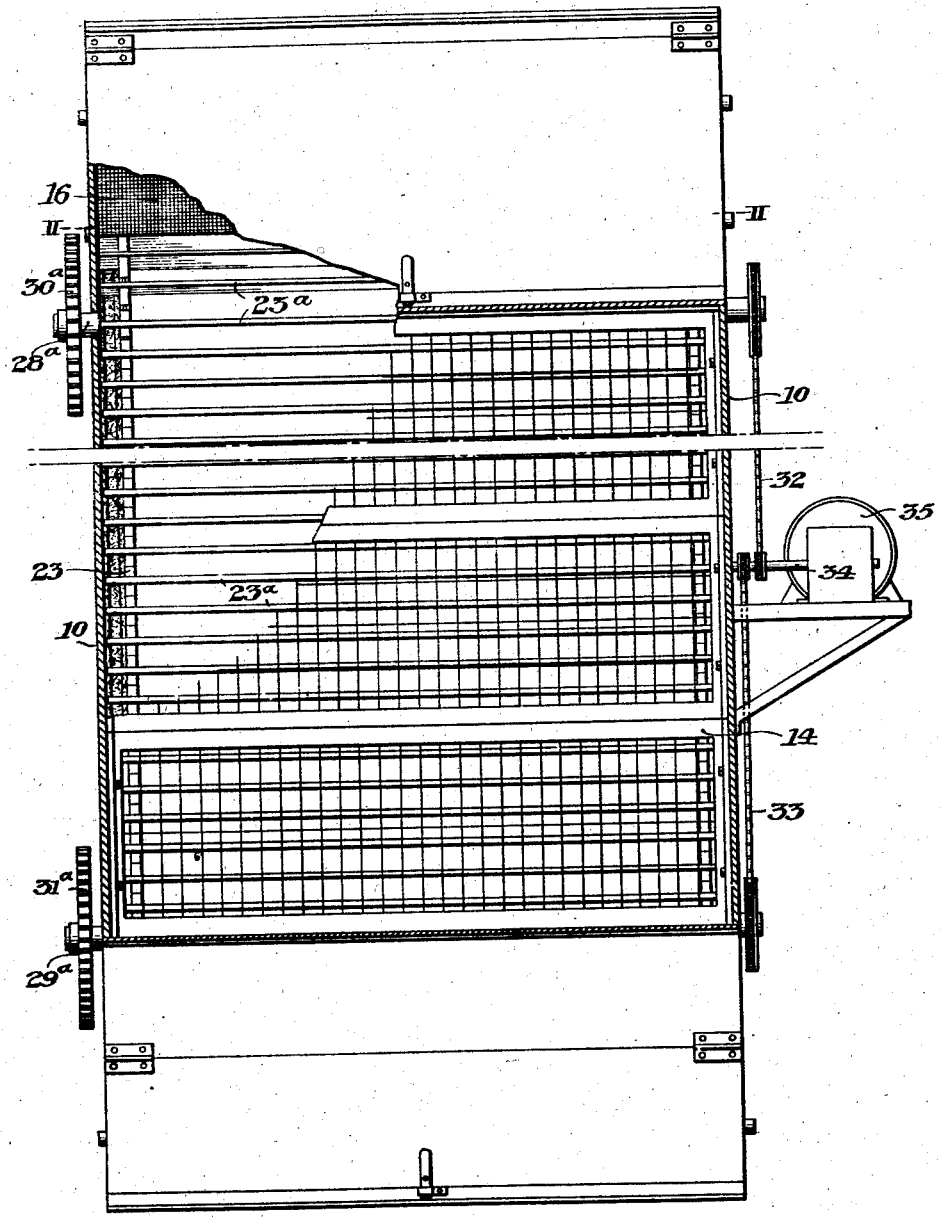
Figure 1 is a front elevation, partly in section and partly broken away, of a form of air and/or gas filtering means arranged for disposal in an air duct or passage, within the scope of my invention.

It has been proposed to employ filtering media movably mounted with respect to an air duct or similar passage, and it has also been proposed to employ corrugated filtering media whereby the effective filtering area has been increased. In all instances of the use of such corrugated sheets or webs, however, they have been disposed in fixed position with respect to the air duct or other passage, and require removal and replacement at relatively short intervals.

I propose to employ a traveling band, sheet, or web of filtering media, which is crimped or corrugated as it is moved, so as to increase the filtering area of a given size duct or other passage. For instance, with a duct panel having a dimension of thirty (30) inches in width and a height of six (6) feet, a sheet of ordinary filtering media would give an area of fifteen (15) square feet. With the use of a moving sheet of corrugated filtering media, such as I propose to employ, the filtering area can be increased approximately one hundred per cent (100%) without increasing the area of the air duct or other passage.

In carrying out my invention, I may provide a frame or enclosure mounted in the air duct or other passage, having side walls 10, 10, which may form part of such air duct or passage, with a chamber 11 at the top and a chamber 12 at the bottom of such frame. At the front and rear of such frame structure, I may provide screens or grilles, indicated at 13 and 14, which serve to keep rodents away from the filtering structure and they preferably lie directly across the duct or other passage through which the air or other gases may be delivered, usually under slight pressure or suction.

Within the chamber or space defined by the side walls 10, 10, and the screens or grilles 13 and 14, I mount a pair of traveling conveyers 15. In the upper chamber 11, I provide a roll of filtering media in web or sheet form, indicated at 16, which may be mounted on a shaft 16ᵃ and driven in any suitable manner; such sheet passing over idler rolls 16ᵇ and 16ᶜ, and continuing downwardly through an opening 11ᵃ in the bottom wall of the upper chamber. This opening may have sealing means in the form of strips of flexible material a, underlying such wall at the margins of such opening and arranged to engage both surfaces of the sheet or web of filtering media.

From the opening 11ᵃ, the sheet or web of filtering media is passed into engagement with the conveyers 15. These conveyers include chains made up of pivotally mounted links; certain of which, every alternate link, for instance, being provided with pointed teeth, preferably of equilateral form, connected by blades or cross-bars and arranged to mesh in the manner indicated in Figs. 1 and 4, and their engagement will have the effect of corrugating the sheet or web of filtering media in the manner indicated.

After leaving the corrugating conveyers at the bottom of the chamber, the filtering media may pass into the lower chamber 12 through an opening 12ᵃ formed in the top wall of the same, past sealing strips a', if desired, and thence around idler drums 18 and 18ᵃ to a shaft 18ᵇ upon which it is wound; such shaft being driven in any suitable manner. If desired, the lower chamber may be provided with means in the form of pressure and suction devices for cleaning the surfaces of the filtering media, or such filtering media may pass through a suitable cleansing bath.

In the form of structure illustrated in Figs. 1, 2, et seq., the conveyers are made up of chains consisting of pivotally mounted links 21 and 22; the links 21 carrying pointed teeth 23 of equilateral form, and the links 22 joining said links 21 throughout the extent of the respective chains. The pointed teeth 23 mesh in the manner indicated in Figs. 1 and 4, and in order to provide the desired corrugating or crimping means for the traveling web or sheet of filtering media, these teeth are connected by cross-bars or blades 23ᵃ. While I do not wish to be limited in any manner in the form of cross-bars employed, I preferably employ bars of the type indicated at 23ᵃ, Figs. 4 and 6, having a rounded outer surface which engages the sheet or web and presses it against the smooth surfaces of drums 24 and 24ᵃ, and 25 and 25ᵃ, mounted on the shafts carrying the sprocket wheels which drive the conveyer chains. By this means, the air duct or other passage is further sealed at the point of engagement by the corrugating means mounted on the conveyer chains.

The chains of the conveyers pass around sets of upper and lower sprocket wheels 26 and 26ᵃ, and 27 and 27ᵃ, which are driven in unison; said wheels being mounted on shafts 28 and 28ᵃ, and 29 and 29ᵃ, respectively. These shafts carry meshing gears 30 and 30ᵃ, and 31 and 31ᵃ, respectively, disposed externally of one of the walls 10, and the shafts 28 and 29 may be driven by sprocket chains 32 and 33 from the shaft 34 of a motor 35. In addition, the shafts 28 and 28ᵃ, carry the drums 24 and 24ᵃ, and the shafts 29 and 29ᵃ carry the drums 25 and 25ᵃ.

The shafts 16ᵃ and 18ᵇ from and to which the filtering sheet or web passes, may be positively driven, if desired, or friction means may be provided to retard the movement of the shaft 16ᵃ, and the shaft 18ᵇ may be turned by means of a weight 18ᶜ, hung from a rope or cord 18ᵈ, and whose mass will be sufficient to wind up the sheet or web of filtering media as it is delivered from the corrugating conveyers.

Figure 4:
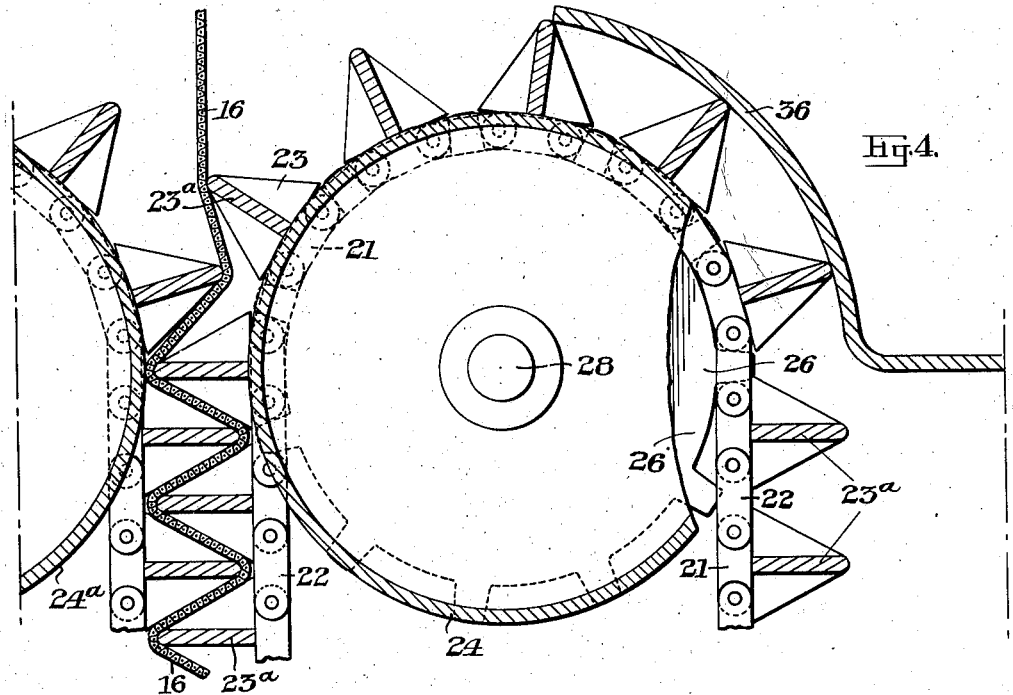
Fig. 4 is a fragmentary sectional view on an enlarged scale illustrating in greater detail the conveying and corrugating mechanism forming part of my invention.

In the enlarged view, Fig. 4, certain of the chain links; those indicated at 21 for instance, carry the teeth 23 and the cross-bars or blades 23ᵃ which extend outwardly from the same, and when chains of such type are placed in cooperative relation, as indicated in Figs. 1 and 4, they form means to corrugate or crimp the sheet or web of filtering media. The links 21 will be connected into chain formation by means of the interposed links 22, in pivotal engagement with the links 21. The blades 23ᵃ extend across the air duct or other passage, and when they pass the horizontal planes of the driving shafts carrying the sprocket wheels and drums, they cause the sheet or web of filtering media moved by the same to engage the surfaces of the smooth rollers or drums, 24 and 24ª, and 25 and 25ª, carried by and moving with the driving shafts. In addition, to further seal the air passage or duct, the inlet side thereof may have curved top and bottom walls 36 engaged by the blades 23ª of the links 23 as the latter are moved toward the point where they engage and corrugate the web or sheet of filtering media and when they leave the same.

Figures 6, 8:
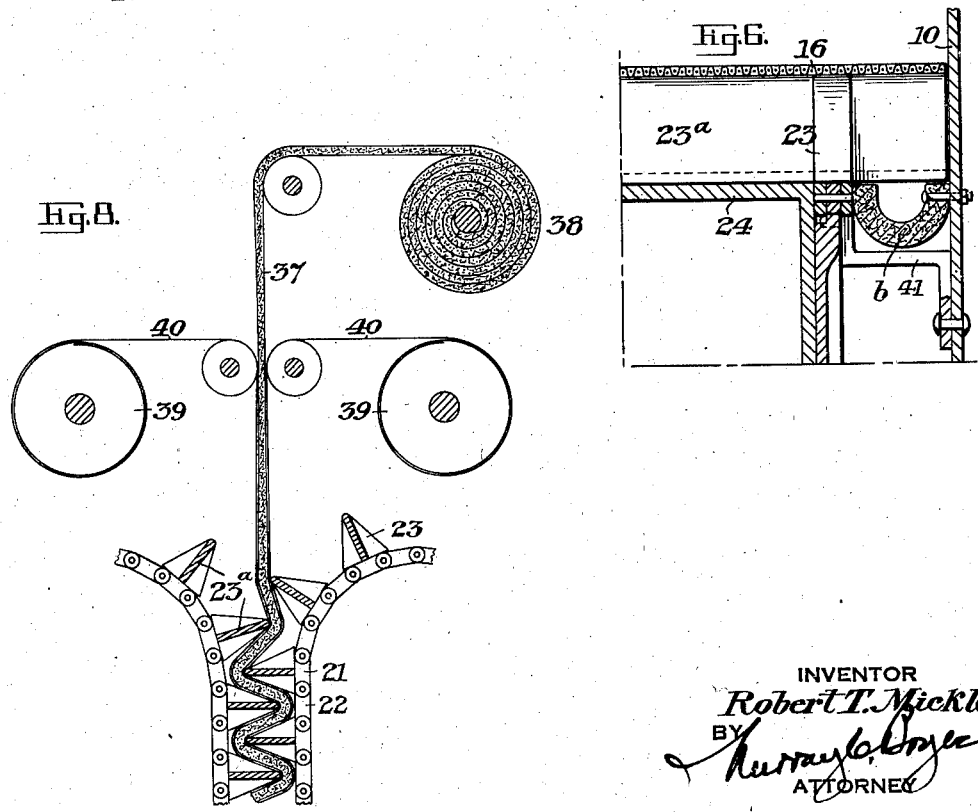
Fig. 6 is a fragmentary sectional view on the same scale illustrating a further detail of my invention.
Fig. 8 is a fragmentary view illustrating a modified form of filtering media within the scope of my invention.

When a mass of flocculent, fibrous material, incapable of sustaining its own weight is employed, it may be passed between sections of foraminous material which support and protect the same. Such arrangement is shown in Fig. 8, wherein 37 represents the mass of loose fibres arranged in the form of a web; the same passing from a suitable roll 38, and the supporting sections of foraminous material, which are preferably delivered from independent rolls 39, being indicated at 40. In lieu of this, the supporting means may be in the form of endless webs of foraminous material carried continuously round and round by the conveyers and arranged to engage the loose flocculent mass as it is delivered from its roll or other source of supply.

To insure that the blades or cross-bars of the chains or belts constituting the conveyers will tightly engage the filtering media and insure proper corrugation or crimping thereof, I may provide vertically disposed backing elements 41, carried by the walls 10 in suitably spaced relation, and in substantial engagement with the chain links of the conveyers.

For the purpose of sealing the side edges of the moving filtering media, which pass adjacent to the walls 10, 10, against entrance of unfiltered air, I may mount curved sections of flexible sealing material b, upon the respective chains; such material being shown more particularly in Fig. 8. These sections of sealing material are preferably shaped so as to have a tendency to expand outwardly and engage the side walls of the casing as the conveyers are moved. In lieu of this, the sealing strips b may be carried by the walls 10 in position to engage the chains. By such means I am enabled to completely close the spaces between the vertical side edges of the filtering media and the walls of the casing. When the sections b of sealing material are carried by the chains, the pivotal connections for the links of the same may have projections to which such sealing strips are secured, inasmuch as it is desirable that they follow the pitch line of the chains.

When the filtering media is of a type that may be re-used, I may provide cleaning means for the same, such as shown in Fig. 3, where the sheet or web of filtering media is shown as passing between pressure and suction boxes 45 and 46; the box 45 having a lower slotted wall 45ª for the discharge of a suitable fluid under pressure from a pipe 45ᵇ, and the box 46 having a slotted top wall 46ª for the passage of the dirt and/or foreign material stripped from the sheet or web of filtering media, which may be carried away under suction via the pipe 46ᵇ.

In the use of my improved filtering means, the air or gas moving through the duct or passage containing the same is under slight pressure or suction with difference in pressure on opposite sides of the filtering medium and continued use, tending to clog the web or sheet of filtering material with dirt or foreign matter, will increase the differential; thereby reducing the volume of filtered air or gas delivered. While this increased differential may not be great it is, nevertheless, desirable that the delivery of the desired amount of filtered air or gas shall be continuous. In those cases where the sheet or web of filtering material is maintained in a relatively static condition and is moved as a whole at intervals, I may employ means for effecting automatic shifting of the sheet or web when the differential is too great and tends to cut down delivery of the filtered air or gas. This may include a motor for shifting the sheet or web, and an automatic switch for controlling such motor; the shifting of the switch being effected by a suitable type of pressurestat which may be suitably located for communication with the air duct or passage on both sides of the sheet or web of filtering material; the work of the motor being to move a fresh section of the sheet or web of filtering material into position across the air duct or passage to the full depth and/or width of the same.

In the diagrammatic view, Fig. 9, I have illustrated means whereby automatic shifting of the filtering medium may be effected. 51 and 52 represent pipes leading from the air duct or passage on opposite sides of the filtering sheet or web to a pressurestat, indicated at 53. There will be a pressure differential in the air duct or passage on opposite sides of the filtering medium at all times, and in employing the pressurestat it may be set in neutral for the initial pressure difference. As the pressure on the inlet side of the air duct or passage rises, due to clogging of the filtering medium with dust, dirt, or other foreign material, the pressurestat will be affected and will operate to close an electric circuit whereby a motor, such as 35ª, may be energized. In this instance I have shown the motor provided with a worm shaft 55 having worms to drive the conveyer shafts at the top of the air duct or passage. The conveyer shafts at the bottom of the air duct or passage may be driven from the upper shafts by sprocket chains 56. Upon a rise in pressure upon the inlet side of the air duct or passage, which may be to a predetermined point, the pressurestat acts to operate the motor for a time sufficient to move a section of filtering material across the entire area of the air duct or passage so as to bring an entirely fresh section into position for further filtering. This action presupposes that the filtering medium, even though corrugated, may be static, and in such movement of the conveyers for the purpose of presenting a fresh section of the filtering medium, it will be slow enough to insure that the filtering medium will be moved and corrugated at the same time. When the corrugated filtering material is under continuous movement at a relatively low rate of speed and is constantly bringing a fresh portion into position for the desired filtering, the mechanism described may be employed to accelerate this movement if, for instance, atmospheric conditions, and/or the character of the gas undergoing filtering should suddenly change, and carry an increased amount of matter to be filtered.

It will be understood, of course, that when the corrugated or other filtering medium is arranged for continuous movement, I may employ the cleansing means indicated, comprising the pressure and suction chambers 45 and 46. With automatic operation under control of the pressurestat, these chambers may be valved, as indicated at 57 and 58, solenoid-controlled, and so arranged in the circuit that when the motor is actuated to effect movement of a section of the filtering medium across the air duct or passage at a single operation, these valves will be closed.

Means of a similar nature may be employed to effect movement of a simple continuous sheet or web of filtering material across the duct or passage, and in Fig. 9 I have indicated by broken lines at 16ˣ, a single continuous sheet or web of filtering material, which may be moved by a motor such as indicated at 35ᵇ, through a worm shaft or suitable gearing; such motor being under the control of the pressurestat, as in the arrangement first described. In use, this form of filtering media would be static until the clogging thereof caused the pressure to rise and influence the pressurestat to start the motor. In this arrangement the filtering media may be arranged to pass through a cleansing bath which may be disposed in a tank such as indicated at 59.

I have indicated that the filtering media, no matter what its form, may be rolled up after it has fulfilled its function. It is within the scope of my invention to so arrange the air duct or passage, as by curved portions, L-sections, or Y-connections, that the filtering medium, even when corrugated, may pass continuously through and over the air duct or passage and be returned, after a cleansing operation, for re-passage and re-corrugation. When continuously moved, the cleansing chambers 45 and 46 may be employed. When moved at intervals upon rise in pressure on the inlet side, other forms of cleansing means may be employed, including a bath through which the filtering media may pass; a portion of the same lying in such bath at all times.

I may employ a form of filter paper as the filtering medium, which paper may be destroyed after use, or I may employ any form of loose flocculent material confined between sheets of wire netting or loosely woven fabric, which may be subsequently cleansed and re-used. If paper is employed as the filtering medium, I may face the engaging surfaces of the teeth 23 with soft fabric, in strip form or otherwise, as illustrated at 16ᵈ, Fig. 10. This soft fabric may be secured to a portion only of each tooth, as indicated, so as to be free to spread with the teeth when the chains carrying the latter are passing around the pulleys or sheaves carried by the drums 24 and 25. This fabric will serve as additional sealing means as the teeth 23 wipe past the curved walls 36.

While reference is made to the fact that the sheet or web of filtering material may be continuously moved across the air duct or other passage, it is within the scope of my invention to provide for intermittent movement. For instance, if the air or gas to be filtered is not highly charged with dust and/or other foreign matter, movement of the filtering material may occur at intervals—daily, weekly, or at other suitable intervals as conditions may demand—to bring a completely fresh section of the filtering material into the field of the passing air or gas.

The drawings show vertically arranged conveyers for moving and crimping the filtering media, but it will be understood that these conveyers may be inclined with respect to the horizontal to impart movement to the filtering material in a diagonal direction, without departing from my invention. It will also be understood that I may employ a series of filtering areas in suitably spaced relation, and that in employing a series, the filtering material may be of progressively finer mesh or interstice; the final sheet or web having the smallest interstices.

While I have illustrated my improved apparatus as delivering the web of filtering media in a downward direction, it will be understood that means may be employed to raise the filtering media across the air duct, without departing from my invention.

My improved filtering structure may be employed to remove suspended particles from hot gases of different character. For such purpose, inasmuch as the heat might be sufficient to destroy ordinary fabric, I may employ filtering media in the form of a sheet or web of glass fabric.

While I have shown sealing sections of U-form carried by the walls 10 as an alternative to the sealing sections carried by the chains, it will be understood that other forms of sealing material may be mounted on the walls so long as they are capable of performing the desired function.

While I have shown more or less specific embodiments of my invention, I do not wish to be limited to the exact constructions represented which are illustrative only of the salient features thereof and are capable of considerable modification; all of which is deemed to be within the scope of the appended claims.

I claim:

1. In air filtering means, the combination of a casing providing an air duct or passage, a sheet of filtering media extending in substantially a straight path across said duct, means for moving the same, means for effecting and maintaining shallow corrugations in said sheet of filtering media simultaneously with its movement, and resilient means carried by the sheet-moving means for sealing the edges of said filtering media against the passage of unfiltered air through said duct or passage.

2. In air filtering means, the combination of a chambered casing forming part of an air duct, a sheet of filtering media arranged for movement within said casing and extending in substantially a straight path across said duct, means for moving said sheet of filtering media, means for corrugating said sheet and maintaining the corrugations during its movement from one chamber to another, and resilient means carried by the sheet-moving means for sealing the edges of said filtering media against the passage of unfiltered air during its movement.

3. In air filtering means, the combination of an air duct, a sheet of filtering media disposed in vertical alignment and in substantially a straight path across said duct, a pair of conveyers mounted for movement within said duct; said conveyers being arranged on opposite sides of said filtering media, drums operatively arranged with respect to each of said conveyers, displacing means including triangular teeth and connecting cross-bars carried by said conveyers in engagement with the sheet of filtering media to effect and maintain corrugation thereof and press the same against the surfaces of said drums when passing thereover, and means for moving said conveyers in unison to impart traction to the sheet of filtering media simultaneously with the corrugation thereof.

4. In air filtering means, the combination of a casing providing an air duct, a sheet of filtering media disposed in vertical alignment and in substantially a straight path across said duct, a pair of conveyers mounted for movement within said casing and disposed on opposite sides of said filtering media; said conveyors including chain links, displacing means including triangular teeth and connecting cross-bars carried by said chain links in engagement with the filtering media to effect and maintain corrugation thereof, means for moving said conveyers in unison, and resilient means disposed between the casing and the means for removing the sheet of filtering media for sealing the edges of the latter as it is moved.

5. In air filtering means, the combination of a casing providing an air duct, a sheet of corrugated filtering media disposed in a substantially straight path across said duct, a pair of conveyers mounted for movement within said casing and disposed on opposite sides of said sheet of filtering media; said conveyors including chain links, displacing means carried by said chain links in engagement with the filtering media to effect and maintain corrugation thereof, means for moving said conveyers in unison, and resilient means carried by the conveyer chains and contacting with the walls of the casing for sealing the edges of said filtering media.

6. In air filtering means, the combination of a casing providing an air duct, a sheet of corrugated filtering media disposed across said duct, a pair of conveyers mounted for movement within said casing and disposed on opposite sides of said sheet of filtering media, displacing means carried by said conveyers in engagement with the sheet of filtering media to effect and maintain shallow corrugation thereof, means for moving said conveyers in unison, and flexible material connected to said conveyers for engagement with the side walls of the casing to provide seals adjacent the edges of the sheet of filtering media.

7. In the structure set forth in claim 2, means for sealing the air duct adjacent the edges of the sheet of filtering media comprising resilient packing carried by the conveyer chains and filling the space between said chains and the walls of the duct.

8. In air filtering means, the combination of a casing providing an air duct and including upper and lower chambers, a continuous sheet of filtering media extending in vertical alignment between said chambers and across said air duct, two sets of chain conveyers disposed in said air duct between the said chambers; said conveyers being arranged on opposite sides of said sheet of filtering media, displacing means including triangular teeth and connecting cross-bars carried by said conveyers for cooperative engagement with the sheet of filtering media and serving to corrugate the same, means for moving said chain conveyers in unison whereby they will effect traction of the filtering material simultaneously with the corrugation thereof, and continuous strips of resilient material carried by the conveyer chains for sealing the edges of said filtering media with respect to the air duct.

9. In air filtering means, the combination of a casing providing an air duct, a continuous sheet of filtering media extending across said air duct, two sets of chain conveyers disposed in said air duct and arranged on opposite sides of said filtering media; said chain conveyers having displacing means in cooperative engagement with the filtering media to corrugate or flute the same transversely of said air duct including triangular teeth carried by the chain links and cross-bars connecting the same, resilient means disposed between the casing and the chain conveyers for sealing the edges of the filtering media as it is moved, a facing of soft fabric for the engaging surfaces of said teeth and serving as additional sealing means, and means for imparting movement to said chain conveyers whereby they effect traction of the filtering media and simultaneously effect and maintain the corrugations thereof.

10. In air filtering means, the combination of a casing providing an air duct, a continuous sheet of filtering media arranged to pass across said air duct in a substantially straight path, independent sets of conveyer chains operatively mounted in said air duct and disposed on opposite sides of said sheet of filtering media, drums operatively associated with said conveyer chains in the upper and lower portions of said air duct, displacing means in cooperative engagement with the sheet of filtering media comprising triangular teeth carried by said conveyer chains and cross-bars connecting said teeth to corrugate or flute the filtering media transversely of the air duct and press the same against the surfaces of said drums, and means for imparting simultaneous movement to said sets of conveyer chains whereby they may effect traction of the filtering media across the air duct while their displacing means effects and maintains the corrugations thereof.

ROBERT T. MICKLE.

CERTIFICATE OF CORRECTION.

Patent No. 2,218,433. October 15, 1940.

FRIEDRICH MÜLLNER.

It is hereby certified that error appears in the printed specification of the above numbered patent requiring correction as follows: Page 2, first column, line 20, for "section 25" read --section 26--; and second column, line 19, beginning with "3. In a food" strike out all to and including "wall." in line 30, comprising claim 3, and for the claims now appearing as 4 and 5, read 3 and 4 respectively; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.